US007005158B1

(12) United States Patent
Kristinsson

(10) Patent No.: US 7,005,158 B1
(45) Date of Patent: Feb. 28, 2006

(54) METHODS OF IMPROVING THE PROPERTIES OF EGG PROTEINS

(75) Inventor: Hordur G. Kristinsson, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 5 days.

(21) Appl. No.: 10/881,454

(22) Filed: Jun. 29, 2004

Related U.S. Application Data

(60) Provisional application No. 60/484,108, filed on Jun. 30, 2003.

(51) Int. Cl.
    *A23L 1/32* (2006.01)
(52) U.S. Cl. ..................................... 426/657; 426/614
(58) Field of Classification Search ................ 426/656, 426/614, 657
    See application file for complete search history.

(56) References Cited

U.S. PATENT DOCUMENTS

| | | | | |
|---|---|---|---|---|
| 1,996,801 A | * | 4/1935 | Fischer | 426/614 |
| 2,744,829 A | * | 5/1956 | Shaffer | 426/32 |
| 3,251,697 A | * | 5/1966 | Lineweaver et al. | 426/322 |
| 3,362,836 A | * | 1/1968 | Scott | 426/10 |
| 3,932,672 A | * | 1/1976 | Pour-El et al. | 426/46 |
| 4,675,201 A | * | 6/1987 | Lee et al. | 426/573 |
| 5,080,911 A | * | 1/1992 | Saitou et al. | 426/32 |
| 5,728,804 A | * | 3/1998 | Sharma et al. | 530/350 |
| 6,235,336 B1 | * | 5/2001 | Akashe et al. | 426/614 |

FOREIGN PATENT DOCUMENTS

| | | | |
|---|---|---|---|
| JP | 55120741 | * | 9/1980 |
| JP | 60251859 | * | 12/1985 |
| JP | 04234961 | * | 8/1992 |

OTHER PUBLICATIONS

Ingadottir, B. et al., "Acid and alkali unfolding and refolding strategies improve the foaming properties of egg . . . ," Technical Program, 2003 IFT Annual Meeting and Food Expo.

Kitabatake, N. et al., "Conformational Change of Hen Egg Ovalbumin during Foam Formation Detected by . . . ," J. Agric. Food Chem. (1987), pp. 953-957, vol. 35.

Kristinsson et al., "Change in Trout Hemoglobin Conformations and Solubility after Exposure to Acid and Alkali pH," J. Agric. Food Chem. (2004), p. 3633-3643, vol. 52.

Kristinsson et al., "The Effect of Acid and Alkali Unfolding and Subsequent Refolding on the Pro-oxidative Activity . . . ," J. Agric. Food Chem. (2004), p. 5482-5490, vol. 52.

Kristinsson et al., "Change in conformation and subunit assembly of cod myosin at low and high pH and after subsequent . . . ," J. Agric. Food Chem. (2003), p. 7187-7196, vol. 51.

(Continued)

*Primary Examiner*—Anthony Weier
(74) *Attorney, Agent, or Firm*—Saliwanchik, Lloyd & Saliwanchik

(57) ABSTRACT

The subject invention provides innovative methods of manipulating the structure and function of egg proteins, preferably albumen, through controlled acid and alkali unfolding and subsequent refolding. The subject invention provides techniques for manipulating egg protein structure to obtain desired optimal properties such as foaming. The subject invention uses a novel approach to induce a conformational change in egg albumen protein (to partially denature these proteins), which advantageously leads to egg albumen protein having improved properties.

19 Claims, 11 Drawing Sheets

OTHER PUBLICATIONS

Kristinsson et al., "Effect of Low and High pH Treatment on the Functional Properties of Cod Muscle Proteins," J. Agric. Food Chem. (2003), p. 5103-5110, vol. 51.

Zhu, H. et al., "Heat-Induced Conformational Changes in Whey Protein Isolate and Its Relation to Foaming Properties," J. Agric. Food Chem. (1994), pp. 846-855, vol. 42.

* cited by examiner

METHODS OF IMPROVING THE PROPERTIES OF EGG PROTEINS

CROSS-REFERENCE TO RELATED APPLICATIONS

This application claims the benefit of provisional application Ser. No. 60/484,108, filed Jun. 30, 2003.

BACKGROUND

Eggs and ingredients derived from eggs are important food commodities; they are used in a vast number of different food formulations. Eggs contain a number of different proteins. Many of these proteins contribute to the excellent functional properties that eggs can invoke in a food system. Egg yolk contains an array of complex proteins, most of which are complexed with carbohydrate or lipid groups (Nakamura and Doi, 2000). Egg white (egg albumen) contains up to 40 different proteins, many of which play very important roles in the functional attributes of egg white (Kilara and Harwalkar, 1996).

One of the most practical roles albumen proteins play is to form foams when an egg albumen solution is exposed to gas supersaturation or mechanical forces (Walstra, 1996; Nakamura and Doi, 2000). Commercial products of egg white (liquid, frozen, and dehydrated egg white) are processed according to strict specifications to provide optimum foaming properties. To achieve superior foaming ability, yolk contamination and heat damage (from drying or pasteurization) should be minimized (Froning, 1994). The quality of egg foam is greatly dependent on the protein concentration and the environmental conditions under which the foam is formed (such as pH and ionic strength) (Hammershoj and Qvist, 2001). High quality foams are typically produced at pH's of 4–5 and 8–9. The way the foam is made is also an important factor that can affect the properties of the foam (Kilara and Harwalkar, 1996). To complicate matters further, the quality of the foam is also a function of the initial quality of the egg albumen (e.g. ratio of firm vs. thin albumen), storage conditions of the eggs, age of the eggs, and the source (different hen lines) of the eggs (Hammershoj and Qvist, 2001). These factors contribute to the great variability seen with egg albumen foams. These factors also make it difficult to compare results reported throughout the literature.

Foams are colloidal systems in which tiny air bubbles are dispersed in an aqueous continuous phase (Damodaran, 1997). The general mechanism behind foam formation is that upon experiencing a force (mechanical whipping or shaking) or supersaturation of a gas, the egg proteins come in contact with the air-water interface and are partly adsorbed to it and, at the same time, partly denature at the interface. This happens because it becomes more favorable for the protein to expose its hydrophobic interior to the air phase, while leaving its hydrophilic part in contact with solution. The proteins form a film at the air-water interface, and this film traps air to form bubbles (Nakamura and Doi, 2000), collectively making a foam. This foam is stabilized by a variety of forces, including the viscosity of the liquid phase and electrostatic and steric forces of the proteins making up the air bubbles (Walstra, 1996). A variety of destabilizing forces also concurrently tend to minimize the foam formation and break down the foam. These include electrostatic attractions (and strong repulsion in very charged proteins) and hydrophobic attraction between the proteins (Walstra, 1996).

For egg albumen, it has been found that different proteins have markedly different foaming properties (Nakamura, 1963; Johnson and Zabik, 1981). These different properties are a result of differences in the structures of these proteins. The prior art is limited regarding the role the different egg albumen proteins play in foamability and foam stability under different conditions. Even less has been reported regarding their effects on the physical properties of the foams (e.g., viscoelasticity and surface properties).

It is generally accepted that egg albumen proteins that form good foams are those that adsorb rapidly and readily denature at the air surface (Nakamura and Doi, 2000). These proteins are capable of reducing surface tension of the air-water interface readily, which is the main factor behind good foam formation. On the other hand, proteins that adsorb slowly and that do not readily unfold are those that contribute to good foam stability (but not good foamability); these proteins form an ordered and stable network at their air interface (Graham and Philips, 1976).

There have been some efforts to connect protein conformational changes with changes in the ability of the proteins to form foams. In summary, it has been found that foaming properties are affected primarily by (a) surface hydrophobicity of the protein (more hydrophobicity=more foaming ability), (b) protein charge density and charge distribution (increased charge leads to too much repulsion and poor foam stability), and (c) protein flexibility (more flexible proteins form foams more readily) (Damodaran, 1997). These physiochemical properties of the proteins are highly influenced by the nature of the environment in which they exist.

Some attempts have been made to increase the foaming functionality of some food proteins. Research on modifying the structure of food proteins to improve foaming properties has focused mainly on heat denaturation experiments. Zhu and Damodaran (1994) showed that heat-induced partial unfolding of whey proteins, as compared to extensive unfolding, increased the foamability and foam stability of the protein. Heat denaturation has in some cases been shown to increase the foaming properties of egg albumen proteins (Kilara and Harwalkar, 1996). This increase can be attributed to an increase in the surface hydrophobicity of the proteins, primarily ovalbumin (Damodaran, 1997; Nakamura and Doi, 2000). However, if heat treatment is too extensive, protein concentration too high, or the protein is at a pH and ionic strength that favors aggregation, coagulation may occur, which adversely affects foaming properties (Kilara and Harwalkar, 1996; Oakenfull et al. 1997).

Until relatively recently, it was a common view that proteins followed a two state behavior upon unfolding—going directly from the native to a fully unfolded random coil state (Dill, 1990). Much information has arisen in the last two decades that points to a far more complex situation than that for many proteins. Some proteins go through stable intermediate states on unfolding, and others unfold only partially, depending on specific solvent conditions (such as specific pH, ionic strength, and ion type). Altering the pH of a protein medium is one method that can be used to unfold proteins. All proteins contain basic and acidic amino acids, resulting in a net charge on the protein. The net charge of the protein is increased as the pH travels in either direction from the protein isoelectric point up to a point where the charge repulsion causes the protein molecule to unfold (Creighton, 1993). Proteins unfold at extremes of pH because the unfolded configuration becomes more energetically favorable under these conditions (Dill and Shortle, 1991). Under these conditions, the hydrophobic forces, which normally account for most of protein stability, are not strong enough to counteract the electrostatic free energy brought about at low or high pH.

Protein unfolding (i.e., denaturation) can also be accomplished by changing the solvent conditions to disrupt the forces that stabilize the protein. This also brings about conditions favoring the extended configuration of the protein. Depending on the functional property desired for the protein, this can have a detrimental or a beneficial effect on proteins.

The extent of unfolding and the configuration a protein molecule possesses at extreme pH values has been found to be very protein-dependent (Goto et al., 1990a; Goto and Fink, 1990). Numerous reports, mainly at low pH, suggest that many proteins may only be partly unfolded under extreme pH conditions while others are extensively unfolded (e.g., Goto and Fink, 1989; Goto et al., 1990a,b; Fink et al., 1994; Nishii et al., 1995). Similar observations have been made, for some proteins, when ionic strength is increased at low pH (i.e., as salts are added) (Goto and Fink, 1994; Fink et al., 1994). Different intermediate states at low pH can be explained by differences in contribution from charge repulsion, which acts to expand and unfold the protein, and hydrophobic forces, which work to contract the structure and stabilize it (Dill and Shortle, 1991; Goto and Nishikiori, 1991). Further decreases in pH or addition of salts can cause partial refolding due to charge screening effects or direct binding of the added anions; this leads to a partial collapse of the extended protein chain (as electrostatic repulsion between the charged unfolded protein chain is lowered; hydrophobic interactions would strengthen in this situation). These intermediate structures, brought about by extreme pH or a combination of pH and salts, are referred to as "molten globules" as they still retain some characteristics of the native state while in other aspects closely resemble the fully unfolded state. Just as with the native state, the properties of this ensemble of non-native states depend very sensitively on the solution conditions.

The molten globular state of proteins has been largely or completely ignored in food science research, with only a few workers recently realizing the potential and role of partially unfolded proteins in food systems (Hirose, 1993; Matsumura et al., 1994; Dickinson and Matsumura, 1994; Tatsumi et al., 1999). Conformational changes at highly alkaline pH have likewise been given little consideration, but results for one enzyme (β-lactamase) indicate that very high pH can lead to a partial unfolding of this protein due to the presence of cations from the bases, just as the presence of anions do at low pH (Goto and Fink, 1989).

Many food proteins have characteristics that allow them to have excellent functionality for gelation, emulsification, foaming, and the like. Studies indicate that after treating some of these proteins to obtain these functionalities, the proteins take on non-native conformations (Dickinson and Matsumura, 1994). Several proteins commonly found in or used in food products have been found to take on a state characteristic of the molten globule under mild denaturing conditions, including extremes of pH. These include myoglobin (Goto et al., 1990a,b), ovotransferrin (Hirose and Yamashita, 1991), serum albumen (Lee and Hirose, 1992), alpha-lactoglobulin (Dickinson and Matsumura, 1994), ovalbumen (Tatsumi et al., 1999), hemoglobin, and myosin (Kristinsson, 2002a, b; Kristinsson and Hultin, 2003a, b). This has not heretofore been investigated for egg albumen proteins.

Direct evidence for the molten globule state in food systems is difficult to achieve as the proteins are either aggregated (gelation) or adsorbed to another phase (emulsification and foaming). However, indirect evidence is available. α-lactalbumen, a protein found in milk, has been extensively studied and has been found to be more readily absorbed to an oil-water interface in its molten globular state (Dickinson and Matsumura, 1994; Matsumura et al., 1994). Cytochrome c in its molten globular state at pH 3.5 was also found to more readily adsorb to an interface of air and water (Gazova et al., 1999). The molten globule is characterized by a non-specific assembly of secondary structure segments, loss of tertiary interactions, and partial exposure of hydrophobic clusters to solvent (Kuwajima, 1989).

Kitabatake and Doi (1987) reported that foamed ovalbumen has increased reactive —SH groups, a situation also observed in the molten globule state of this protein at acid pH (Tatsumi et al., 1999). Recent studies have suggested that in order for a protein to travel across or be inserted into hydrophobic cell membranes, it takes on a configuration characteristic of the molten globule (Sedlak and Antalik, 1998; Gazova et al., 1999).

Studies on the molten globules discussed above have been done at extremes of pH (pH 1–3 and pH 11–13), which are not practical pH values for most food systems, including those that would employ egg white.

There has been no known study, even suggested or proposed, regarding how controlled acid and alkali denaturation, followed by pH readjustment to renaturing conditions, affects the foaming properties or conformation of the albumen proteins, collectively or individually.

BRIEF SUMMARY OF THE INVENTION

The subject invention provides innovative methods of manipulating the structure and function of egg albumen proteins through controlled acid and alkali unfolding and subsequent refolding. The subject invention provides techniques for manipulating egg protein structure to obtain desired optimal properties such as foaming. The subject invention uses a novel approach to induce a conformational change in egg albumen protein (to partially denature these proteins), which advantageously leads to egg albumen protein of increased hydrophobic and flexible nature.

The subject invention relates to the surprising discovery that foaming/whipping and other properties of egg proteins can be enhanced following acid and alkali treatment, and that different unfolding conditions yield different molecular structures with different functionalities. The subject invention now allows tailoring protein structures and functionalities based on how they unfold and refold once pH is readjusted away from the denaturing pH values.

Described in more detail below is how different low and high pH unfolding and refolding strategies affect the properties (preferably the whipping/foaming properties) and the structure and denaturation state of egg albumen proteins (collectively and individually). The subject invention also furthers the understanding of the structure-function relationship of egg albumen proteins (how structural changes in proteins explain different functional properties observed). This invention in part explains the relationship between functional and structural changes seen in the proteins after acid/alkali unfolding and refolding, and establishes a molecular basis of improved foaming ability, for example. Thus, the subject invention allows modifications of protein structure by using sound science rather than trial-and-error manipulation. The subject invention includes products of a functional nature that were previously unattainable using conventional methods.

The subject invention includes the use of preferred pH ranges for each of various steps, as well as the use of preferred acids, bases, salts, ionic strengths, and time of denaturation and renaturation. The subject invention also includes the treatment of preferred proteins as described in more detail below. Preferred combinations of the above variables are also included within the scope of the subject invention.

In summary, it is presently shown that producing different molten globular forms of preferred proteins (by manipulating the environment of the molten globules) leads to improved functionality such as foaming (by creating different conformational states with different functionalities). Egg proteins are preferred, but the subject invention is not limited to use with egg proteins. Other proteins can also be modified according to the techniques of the subject invention.

Furthermore, a major benefit of using pH adjustment is that there is no costly thermal input into the system (which is involved in heat-modification processes), and it does not require any unusual equipment. Thus, employing different "extreme" pH treatments according to the subject invention provides simple, safe, and economical alternatives to induce a positive conformational change in the egg albumen proteins to increase their foaming properties. The high and low pH's provide an added benefit of inactivating microorganisms (e.g., Salmonella) contaminating the egg white or commercial egg white product.

DETAILED DESCRIPTION OF THE INVENTION

Figure 1:
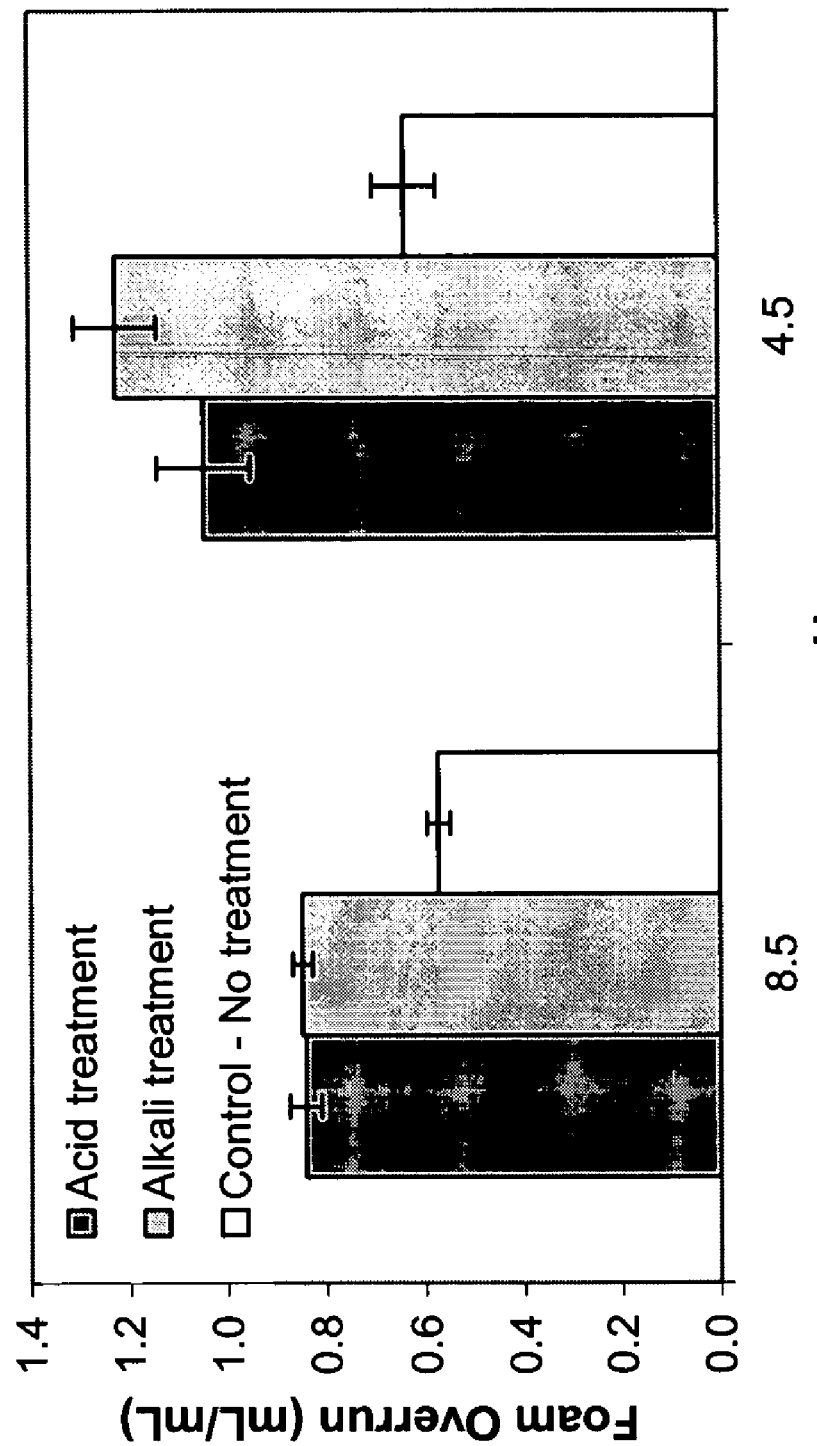
FIG. 1 shows foam overrun of acid- and alkali-treated egg albumen solutions compared to untreated solutions. This Figure is discussed in Example 7.

This invention provides techniques for directing structural changes in egg proteins to positively affect their function, preferably as foaming agents. Egg and egg-ingredient processors, following the teaching of the subject disclosure, will be able to systematically produce ingredients with pre-specified and improved functional properties. Having the benefit of the tools of the subject invention, food scientists will now be able to produce egg-white-based foods having improved functionality, such as optimal foaming ability. This invention provides foams of egg albumens with greatly enhanced function using proper pH manipulation techniques.

Egg proteins are preferred, but the subject invention is not limited to use with egg proteins. Other proteins can also be modified according to the techniques of the subject invention.

The subject invention relates in part to the surprising discovery that the molten globular structure can be created for proteins at pH values that are practical for food systems. In preferred embodiments, this is accomplished by first unfolding the proteins partially at very low or high pH under a variety of different solution conditions (such as specific low/high pH, ionic strength, ion type, time, and the like), followed by readjusting the pH to a "non-denaturing" pH value using different refolding techniques. Many proteins are reversibly refolded from low and high pH. However, by controlling the way this is accomplished, it is shown herein that it is possible to trap the unfolded protein in a partly refolded structure (and thus still partly unfolded structure) with enhanced function. Some proteins that are extensively unfolded at low pH very interestingly will partially refold as pH is lowered even further (i.e., as more acid is added), which is counterintuitive.

The subject invention stems in part from the observation that in the molten globular state, a protein has increased hydrophobicity and flexibility on acid and alkali unfolding and exhibits a more amphiphilic nature (a balance of hydrophobic and hydrophilic regions) than in its native state. The molten globule state of a protein thus bears all the positive characteristics a good foam-forming protein should have. It is therefore likely that the molten globule would more effectively interact with both water and a hydrophobic phase (air or lipid) (Hirose, 1993). Increased surface hydrophobicity is generally correlated with increased emulsion and foaming ability since initial anchoring of the protein on the interface involves exposed hydrophobic groups (Damodaran, 1997). Also, as the molten globule is partially unfolded and more flexible it will more easily further unfold once at the interface, causing it to be a very effective emulsifier (Matsumura et al., 1994) or foaming agent. Furthermore, it has been reported that the structure and physical characteristics of the adsorbed layer generated from the molten globule is different than that generated from the native state, as it exhibits reduced surface shear viscosity (Dickinson et al., 1988; Dickinson and Matsumura, 1994). The functional properties of different molten globular states have been studied recently (Kristinsson, 2002a, b; Kristinsson and Hultin, 2003a, b) and are discussed further herein.

Thus, the subject invention was premised in part on the theory that manipulating the molten globule structure of egg (and other) proteins could enhance their foaming ability and other desirable traits. No known studies have been previously performed or suggested in this regard.

The teachings of some of the above references have been presently interpreted as pointing to the possibility that the native state may in fact be transformed into a molten globular configuration when it is adsorbed to an interface, such as when foams are formed. As the molten globule is already partly unfolded, flexible and with exposed hydrophobic groups, it would be at an advantage over native proteins in that it could rapidly adsorb to the air interface and more easily unfold further (since it is party unfolded already) to form a good foam. Also since the molten globule has more reactive sulfhydryls present (for those proteins with S—S and SH groups) it may thus have a stronger tendency to interact at interfaces and form more stable foams.

In the context of muscle proteins (both complex mixtures of myofibrillar and sarcoplasmic proteins, and also on isolated myosin), results show that using extreme pH (pH 2–3 and pH 10.5–11.5) to unfold these proteins and then refold them via different pH readjustment treatments is able to form different stable molten globular protein structures with enhanced functionalities (Kristinsson, 2002a; Kristinsson and Hultin, 2003a, b). On the molecular level, it is shown that these molten globules retain much of their secondary helical structure but lose much of their tertiary structure resulting in them having more hydrophobic and open flexible structures than the native proteins (i.e., those that are not pH treated). These conformational changes were directly responsible for the increased functionality of the proteins. The most significant finding was that differences in the molecular configuration of the muscle proteins translated to different functional properties, as proteins unfolded and refolded from pH 11 had a more misfolded structure (i.e., less recovery in tertiary structure and more hydrophobicity) than those unfolded at pH 2.5 and refolded. In turn, they had better function than both acid treated and untreated proteins. This suggests that different functional properties can be tailored based on the unfolding and folding conditions the protein experiences.

In preferred embodiments, techniques of the subject invention are applied to proteins from egg albumen. Preferably, egg albumen proteins are denatured at different low (pH 2–3, preferably; one option is using HCl) and high pH's (pH 11–12, preferably; one option is using NaOH) for a set period of time. The pH of the protein solution is then readjusted to, for example, 4.5 and 8.5. With reference to Example 9, it was further surprising to find that the pH-treated proteins performed considerably better at pH 4.5 than at pH 8.5, while the untreated proteins had the same foamability at these pH's. This seems to be directly related to differences in structure, i.e., that the proteins readjusted to pH 4.5 have slightly more recovery in native structure but at the same time are still lacking a significant portion of the native structure. There are also indications that these structures have higher surface hydrophobicities, which may explain this difference.

The subject invention still further relates to manipulating the effects of controlled acid and alkali treatments on egg albumen functional properties, especially foaming (which is a major functional attribute of these proteins). This is the first known disclosure regarding how different acid- and alkali-induced unfolding, followed by refolding, affect the foamability of egg proteins and the resulting functional changes that are connected to the structure of the treated proteins.

The subject invention further relates to the specific proteins that are most affected by the pH-treatments and, thus, those proteins that can be best enhanced, functionally, according to the methods of the subject invention. The subject invention allows one to customize the structure of egg albumen proteins at low and high pH and after pH readjustment (i.e., upon refolding) depending on the unfolding and refolding conditions used according to the subject invention. Factors that can be adjusted according to the subject invention include adjusting (low or high) the pH during unfolding, the duration of time the protein is left to unfold at that pH, and the ionic strength. By using the methods of the subject invention, one can obtain refolded proteins having improved functionality. The subject invention includes analyzing the structure of the improved proteins and determining what change in the protein structure is responsible for changes in functionality. The subject invention also provides the optima for the improved proteins to express their functionality compared to native proteins (e.g., pH, ionic strength, and the like). Improved egg proteins of the subject invention can interact differently after pH treatments of the subject invention. Thus, the subject invention allows one to predict how proteins can be improved and how to maximally express their functionality.

Egg white proteins were subjected to a variety of different low and high unfolding and refolding pH treatments, and their foaming properties and structures were examined. Control experiments were done on untreated egg proteins. Experiments were performed on: (a) egg albumen (egg white) proteins and (b) select isolated egg albumen proteins (e.g., Ovalbumen). These techniques can also be applied to, for example, Ovotransferrin (conalbumen), Ovomucoid, Ovomucin, Lysozyme, and Ovoglobulins. Experiments with egg albumen, which is a collection of all the proteins in egg white, were used to elucidate the effects of the different pH treatment on the proteins overall. On the other hand, the same experiments were performed on the individual proteins to elucidate which specific proteins are responsible for the changes seen in function of the egg albumen. Individual egg albumen proteins can then be subjected to those pH treatments that caused the most change in the desired properties (preferably foaming/whipping properties), both alone and in combination with other isolated proteins.

In summary, preferred treatments according to the subject invention involve dissolving egg proteins in solution at varying concentrations (1, 5, 10%, for example) for at least 1 hour at room temperature with gentle stirring until all the protein becomes soluble. The pH of the solution is then adjusted to low and high pH values, followed by a pH readjustment to pH values that are typically employed in foaming practices. Following are sample variables used in different pH-treatments:

1. Unfolding pH's
   a. pH 1.5–3.5 (acid unfolding)
   b. pH 10.5–12 (alkali unfolding)
2. Unfolding time
   Select holding times of 10 sec (min) to 24 h (max)
3. Refolding pH values
   pH 4.5–9
4. Refolding time
   a. Rapid refolding (pH adjusted quickly to desired refolding pH)
   b. Gradual refolding (pH adjusted slowly to desired refolding pH)
5. Ionic strength
   50–200 mM
6. Ion type:
   a. NaCl
   b. KCl
   c. $Ca_2Cl_2$
   d. others Different low and high pH values can be selected to induce different levels of protein unfolding due to variations of electrostatic repulsion and ionization in the protein. These factors can be selected and adjusted to create improved proteins with different structures, as compared to the native proteins.

Unfolding time is different for different proteins, some unfold very fast while others do so slowly. Different unfolding times can be selected to lead to variable levels of unfolding of the proteins.

The way proteins refold from low or high pH is greatly dependent on the specific pH to which they are adjusted. Different egg albumen proteins also have different protein isoelectric points. Thus, at one pH, some may be very stable while others are partly unfolded. Therefore, different refolding pH's can be selected to obtain different partially refolded structures with different properties (such as improved foaming). This is demonstrated by results discussed herein.

Variations in refolding time can also be selected to lead to different protein structures and structural assemblies (i.e., protein—protein interactions). Rapid refolding leads to more recovery in the native structure of the protein, while slow refolding leads to a more hydrophobic and partly refolded protein (with better foaming properties). Slower refolding also leads to more protein—protein interactions, thus causing a network of partly folded proteins to form in solution. These protein networks can also have an effect on foaming and other properties.

Ionic strength is another factor that can be manipulated according to the subject invention. Ionic strength has an impact on what type of unfolded structure the protein takes at low and high pH. The presence of ions at low and high pH apparently hinders the formation of a fully unfolded state at low pH due to ion cross-bridging between the repulsive charges. This leads to less unfolding but still yields a protein with sizable exposure of hydrophobic groups. Furthermore, the ions apparently interfere with the refolding process when pH is readjusted from low and high pH, thus causing the pH-treated proteins in the presence of different levels of salts to have different structures and different resulting functions. The presence of salt was known to influence the foaming properties of egg proteins, but it was not heretofore known how it impacts the partly refolded proteins. One preferred salt is NaCl, preferably at an ionic strength of 100 mM, was employed and it did not interfere with foaming. Anionic strength of 50 mM is the preferred lower limit as it is difficult to solubilize egg albumen at an ionic strength below this.

The type of ion(s) present during the pH treatments can also be selected to impact the way the proteins unfold and refold. This is in part because different ions have different influences on water structure and therefore influence whether it becomes more or less favorable for proteins to open up (i.e. unfold) and expose their hydrophobic groups to solution. As mentioned above, NaCl is one preferred salt.

Having the benefit of this disclosure, one can compare the pH-treated proteins to those that do not undergo any treatment. The functionalities of the pH-treated proteins can also be compared to those subjected to other treatments reported in the literature to enhance foaming ability (e.g. various heat treatments).

All patents, patent applications, provisional applications, and publications referred to or cited herein are incorporated by reference in their entirety to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLE 1

Foam Formation Procedure and Summary of Subsequent Analyses of Effects of Various pH-Treatments on Foaming/Whipping Properties Standard foam formation procedures were performed on the untreated vs. pH-treated protein solutions. A handheld SUNBEAM mixer at maximum speed was used initially, but this did not produce foams of an ideal character. Thus, a Bamix mixer was used, and much better foams were formed. Therefore, foams (from 100 mL solution) were prepared by using a Bamix mixing device, at the highest setting, connected to a rheostat. Different times of whipping (30 sec to 10 min) and different rheostat voltages (50–100%) will be tested initially to determine the optimal foaming conditions for select pH-treated and untreated solutions. For the measurements of foam properties foam samples will be carefully transferred to their respective measurement devices, including excess foam in the whipping bowl and on the beaters, which will be carefully scraped with a rubber spatula. Each pH treatment will be tested in at lease triplicate.

The egg albumen and individual egg albumen proteins will be investigated for their foaming/whipping properties after having been subject to the above treatments. The properties discussed in the following examples were measured in at least triplicate for each treatment.

EXAMPLE 2

Foam Overrun and Air-Phase Fraction

The initial solution (100 mL) used to make the foam, and then 100 mL of the foam, were weighed in graduated cylinders. Overrun and air-phase volume fraction of the foam proteins was measured essentially as described by the method of Campbell and Mougeot (1999):

$$\text{Foam overrun} = \frac{(\text{weight of 100 mL solution}) - (\text{weight of 100 mL foam})}{(\text{weight of 100 mL foam})}$$

$$\text{Air-phase fraction } (\phi) = \frac{\text{Foam overrun}}{\text{Foam overrun} + 100}$$

EXAMPLE 3

Foam Stability and Liquid Drainage

The stability and liquid drainage of the egg albumen foam was measured by following phase separation with time (until full separation is accomplished):

$$\text{Foam stability} = \frac{\text{Foam volume at time } t}{\text{Initial foam volume}}$$

$$\text{Liquid drainage} = 1 - \frac{(\text{Initial liquid volume} - \text{Liquid volume in foam at time } t)}{(\text{Initial liquid volume} - \text{Initial liquid volume in foam})}$$

The protein profile of the foam vs. drained liquid will be analyzed to understand how different proteins in the egg albumen fraction contribute to foam formation and stability after different pH-treatments. Separate foam stability experiments can be performed for this since it requires sampling of the foam and liquid. Samples can be drawn from the foam with a spoon and from the drained liquid with a long needle or glass pipette. Sample protein content can be measured according to the modified Lowry method by Markwell et al. (1978). Samples can then be prepared for protein electrophoresis according to the method of Laemmli (1970) and protein composition can be determined and quantified using a pre-cast 4–20% gradient SDS-PAGE gel as described by Kristinsson (2001).

EXAMPLE 4

Foam Rheological Properties

To obtain detailed information on the properties of the foam generated from different treatments, rheological tests can be performed using a controlled stress AR2000 Advanced Rheometer (TA Instruments, New Castle, Del.). This rheometer is capable of collecting a wealth of different rheometric data from single runs; this can be used to determine the different behaviors of foams from different treatments. Experiments can be conducted using parallel plate geometry as described by Khan et al. (1988). Foam samples can be carefully layered on the rheometer bottom plate and a parallel plate lowered down on the foam to a specified gap. To prevent foam slippage, which is an inherent problem with liquid foams, the plate can have a pasting sandpaper (No. 120; 3M Corporation) attached to it. This causes the liquid to reside in the depressions between the particles of the sandpaper, thus eliminating the effect of the liquid film on rheological measurements, as reported by Khan et al. (1988). Different rheological experiments at 20° C. can be performed on select samples:

a) Shear-rate experiments

The foam can be subject to increasing shear rates from $10^{-3}$ to $10^3$ s$^{-1}$. This test measures the deformation of the foam under increasing levels of force. Several foam responses will be recorded collectively by the rheometer with foam viscosity and foam storage modulus (G' and G") being of most interest for our purposes.

b) Yield-stress experiments

Yield-stress is a sensitive measure of the properties of a foam as increased yield stress is seen with increased overrun (Luck et al., 2002). Yield-stress is a function surface tension, air phase volume and bubble size (Princen and Kiss, 1989). The stress-relaxation technique of Boger and Dzuy (1983) as modified by Khan et al. (1989) can be employed. The foam can be subjected to a low shear-rate (so foam structure will not break down) until steady state is achieved, and then shear-rate can be stopped leading to relaxation of the foam (to 0 if the foam has no yield stress). Torque response can be recorded and yield-stress is the equilibrium reading reached after relaxation.

c) Creep-test experiments

Creep-tests are a good indicator of foam quality. Foams can be subjected to constant stress (i.e., a fixed value of shear-rate) for a fixed time period and then compliance (m$^2$/N) measured with time. An increase in compliance is usually seen with time for foams, and high compliance indicates a "good" foam while low compliance indicates a "bad" foam.

EXAMPLE 5

Effect of Various pH-Treatments on Molecular Properties

Two different, preferred conformational probes were employed to assess the effect of the different pH-treatments listed above on the conformation and structure of the egg albumen proteins (collectively and individually). Native proteins were used as the control for all these studies. Intrinsic tryptophan fluorescence was employed, which is a good method that enables the estimation of the percent denaturation in the pH treated proteins. For an even more informative and detailed analysis of protein conformation and denaturation, circular dichroism (CD) analysis was used. A Jasco-720 spectropolarimeter is preferred. The hydrophobicity of the protein was further measured using a fluorometric dye, as describe below. Dilute solutions of egg albumens and isolated egg proteins were prepared for these studies and then subjected to the pH-treatements outlined previously.

5.A.—Protein Secondary and Tertiary Structure

Changes in secondary (2°) and tertiary structure (3°) was determined using far-UV (190–260 nm) and near-UV (260–350 nm) circular dichroism (CD) spectroscopy, respectively using a Jasco-720 spectropolarimeter. The former can report on changes in the backbone structure of the proteins (α-helixes and β-sheets) while the latter can report on change occurring with the interactions of the secondary structures that make up the protein fold (i.e., tertiary structure). Changes in tertiary structure are of more importance than those in the secondary structure, in terms of changes in the foaming properties of the proteins (Damodaran, 1997). Proteins solution exemplified are 0.01 mg/mL and 1 mg/mL for the far- and near-UV CD, respectively. Changes in the content of secondary/tertiary structure were calculated according to Haezebrouck et al. (1995). Protein content of the solutions was measured according to Markwell et al. (1978).

5.B.—Protein Surface Hydrophobicity

Exposure of hydrophobic residues of the pH-treated vs. untreated proteins was assessed by the proteins ability to bind to a hydrophobic fluorescent dye, 8-anilino-1-napthalene-sulfonic acid (ANS). A solution of 0.1 mg/mL pH-treated and untreated proteins was serially diluted to give 0.01–0.1 mg/mL solutions and excess ANS added (10 uL of 10 mM ANS in 1 mL protein solution). Protein content of the solutions was measured according to Lowry et al. (1951). A Perkin Elmer LS-45 luminescence spectrofluorometer was used to measure the fluorescence of the ANS-protein complex. Excitation is set at 380 nm and emission spectra read from 400–550 nm after 15 minutes of adding ANS. The fluorescence emission intensity at 470 nm was plotted against protein concentration (0.01–0.1 mg/mL) and surface hydrophobicity measured from the slope of the linear curve (Kristinsson and Hultin, 2002).

EXAMPLE 6

Protein—Protein Interactions

High molecular weight polymers of egg albumen proteins can form during whipping; this has been found to influence foaming properties (Trziszka, 1993). The presence of polymeric species of egg albumen proteins was analyzed by subjecting the foam samples to size exclusion chromatography and analyzing collected fractions with electrophoresis. Electrophoresis was performed on samples with (SDS-PAGE) and without reducing agents and SDS (Native-PAGE), to elucidate the interactions making up the protein polymers (if formed). Increase or decrease in accessible (reactive) and inaccessible sulfhydryl groups of the pH-treated and untreated samples was assayed according to Lin and Park (1998) using Ellman's reagent, since these are known to impact proteins' ability to form good and stable foams (Kitabatake and Doi, 1987).

EXAMPLE 7

Creation of Egg Albumen Proteins with Improved Properties

In preferred embodiments, these techniques are applied to proteins from egg albumen. Preferably, egg albumen proteins are denatured at different low (pH 2–3, preferably; preferably using HCl) and high pH's (pH 11–12, preferably; preferably using NaOH) for a set period of time and then readjusted the pH of the protein solution to, for example, 4.5 and 8.5. Changes in the protein structure were monitored during this treatment using fluorescence of protein tryptophan residues. Foaming experiments were also performed on the pH-readjusted proteins compared to untreated (native) and heat-treated proteins. These studies have shown that unfolding the albumen proteins under acid or alkali conditions for even only 5 minutes and then readjusting the pH, leads to proteins with all the characteristics of partly unfolded molten globular structures. Furthermore, these structures had substantially ($P<0.01$) better whipping/foaming performances compared to untreated (and even heat treated proteins). Results from foam overrun measurements after whipping a 5% egg albumen solution at 20° C. for 30 seconds are depicted in FIG. 1, which shows foam overrun of acid- and alkali-treated egg albumen solutions (50 mg/mL=5%) compared to untreated solutions. The pH-treatments were performed by adjusting the pH of egg albumen solution to pH 2.5 (acid-treatment) or 11 (alkali-treatment) for 5 minutes and then readjusting pH rapidly to 4.5 or 8.5 and leaving the solution to stand at that pH for 10 minutes prior to whipping solutions. Foam overrun was measured as described above. All solutions were at 100 mM NaCl. Results are an average of triplicate measurements. See FIG. 1.

Foam stability of the acid and alkali treated proteins were also significantly improved compared to untreated proteins. When structural changes were studied collectively for all the egg albumen proteins it was evident that: (a) the proteins did not revert back to their native structures but remained partially denatured after acid- and alkali-treatment, and (b) the proteins reverted back to different partially denatured structures when readjusted from pH 2.5 or pH 11 to pH 4.5 and 8.5. This data is presented in Table 1, which shows percent native structure remaining in egg albumen proteins during and after acid- and alkali-treatment, as measured by intrinsic fluorescence spectroscopy. Time treatments were the same as for FIG. 1, however protein concentration was 0.01 mg/mL. Untreated proteins represent 100%. Solutions were at 100 mM NaCl and at 20° C. Results are an average of triplicate measurements.

EXAMPLE 8

Effects of Different pH Treatments on Foaming Properties

Figure 2:
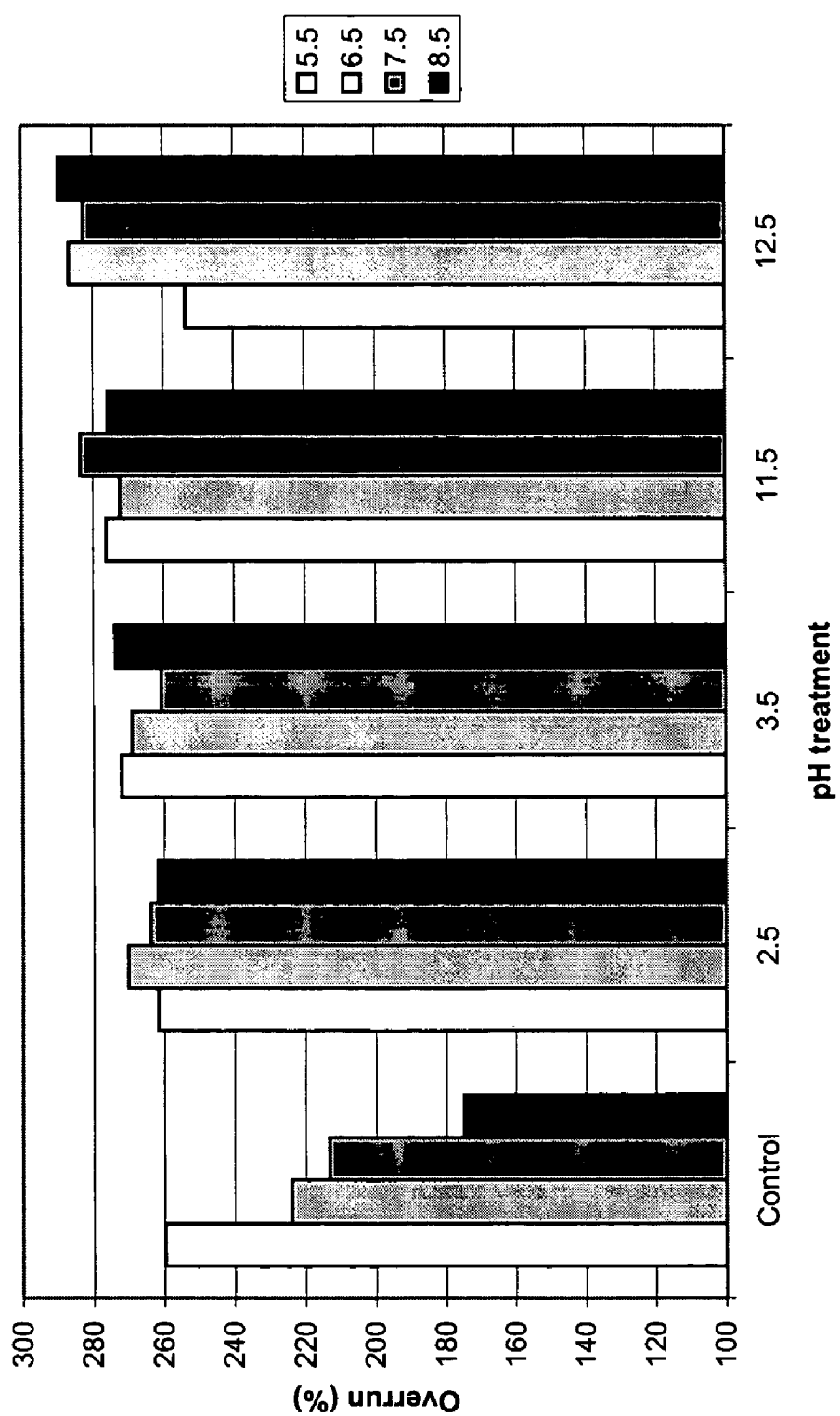
FIG. 2 shows foamability of egg albumin after adjustment to different low and high pH values for 1 hour followed by readjustment to pH 5.5–8.5.
Figure 3:
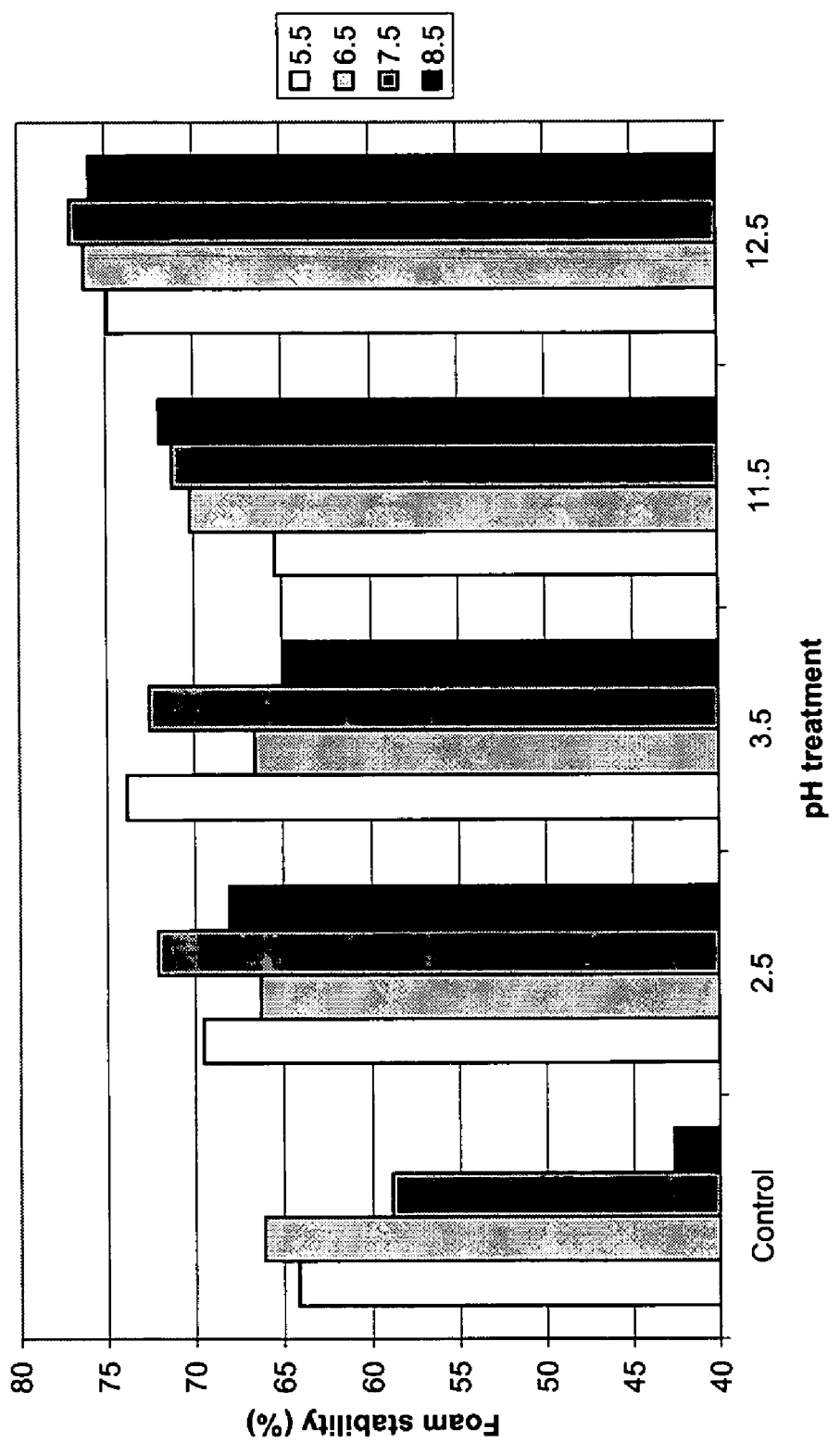
FIG. 3 shows foam stability of egg albumin after adjustment to different low and high pH values for 1 hour followed by readjustment to pH 5.5–8.5.

A large range of different unfolding and refolding pH values have been tested herein, and results show that the subject invention can be used to obtain great improvements in foamability (overrun), foam stability, and foam drainage. The improvements are most notable between pH 5.5 and 8.5, which are in the range of most foods where foam formation would be desirable. This increase has been found to be due to significant conformational changes in the proteins. The proteins have a more open, flexible hydrophobic structure. A substantial increase in reactive sulfhydryl groups has also been found for the pH treated proteins, leading to increased disulfide bonds on foam formation which in turn gives better and more stable foams. FIGS. 2 and 3 show results for select unfolding and refolding pH values.

FIG. 2 shows foamability of egg albumin after adjustment to different low and high pH values for 1 hour followed by readjustment to pH 5.5–8.5. Egg albumin (solution at 2.5% protein concentration) sat at pH 5.5–8.5 for 45 min before whipping with a Bamix homogenizer with a foam disk attachment for 1 min. Control refers to egg albumin which was not treated to low or high pH but was directly adjusted to pH 5.5–8.5 before foaming. Overrun refers to the volume increase of the foam, 100% meaning there was a 100% volume increase in the egg albumin solution on foaming. A higher number refers to a larger foam.

FIG. 3 shows foam stability of egg albumin after adjustment to different low and high pH values for 1 hour followed by readjustment to pH 5.5–8.5. Egg albumin (solution at 2.5% protein concentration) sat at pH 5.5–8.5 for 45 min before whipping with a Bamix homogenizer with a foam disk attachment for 1 min. Control refers to egg albumin which was not treated to low or high pH but directly adjusted to pH 5.5–8.5 before foaming. Foam breakdown (stability) was measured 30 min after foam formation. Stability refers to the separation of liquid from foam (foam breakdown). For example, 50% means that half the foam had broken down (i.e. equal volume of solution and foam); a higher number refers to more stability.

EXAMPLE 9

Effects of Specific Ions During Different pH Treatments

Results show that, according to the subject invention, inclusion of specific ions during the pH treatment of egg albumin has a significant positive impact on foaming. The inclusion of ions influences the conformation the proteins take and can also lead to cross-linking between the proteins to increase foamability and stability. Ions that can be used according to the subject invention include, for example, KCl, $MgCl_2$, NaCl, $CaCl_2$, K, Na, $Ca^{2+}$, Cl, and $Mg^{2+}$. The

TABLE 1

| Acid-treatment | | | Alkali treatment | | |
|---|---|---|---|---|---|
| pH 2.5 | pH 2.5 -> 4.5 | pH 2.5 -> 8.5 | pH 11 | pH 11 -> 4.5 | pH 11 -> 8.5 |
| 0.61 ± 0.03% | 0.78 ± 0.04% | 0.72 ± 0.015% | 0.50 ± 0.02% | 0.83 ± 0.03% | 0.76 ± 0.01% | example below shows the effect of adding 10 mM calcium chloride ($CaCl_2$) to an egg albumin solution on foamability and foam stability.

Figure 4:
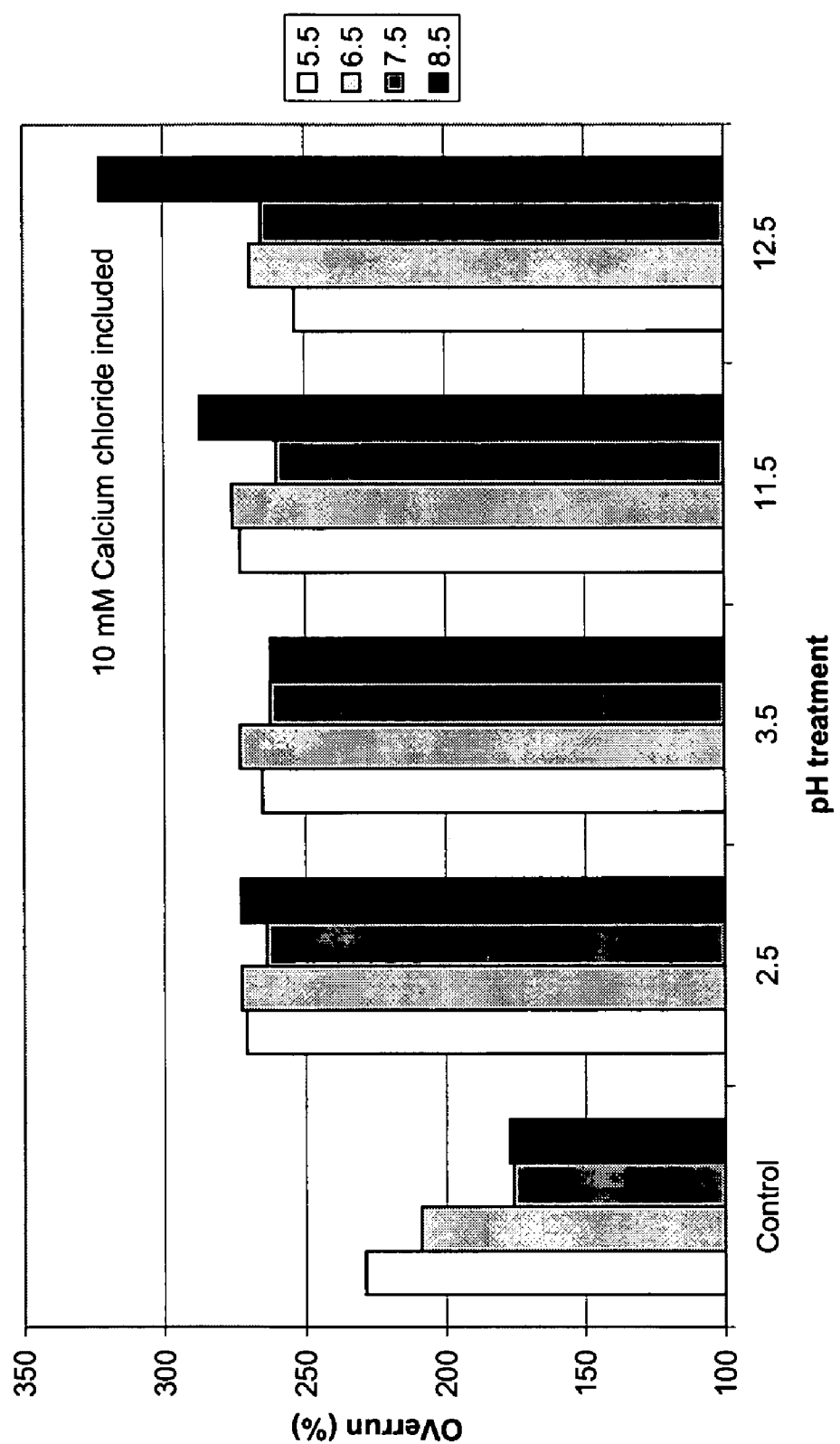
FIG. 4 shows foamability of egg albumin in 10 mM $CaCl_2$ solution after adjustment to different low and high pH values for 1 hour followed by readjustment to pH 5.5–8.5.

FIG. 4 shows foamability of egg albumin in 10 mM $CaCl_2$ solution after adjustment to different low and high pH values for 1 hour followed by readjustment to pH 5.5–8.5. Foam-formation conditions and overrun are explained above regarding FIG. 2.

Figure 5:
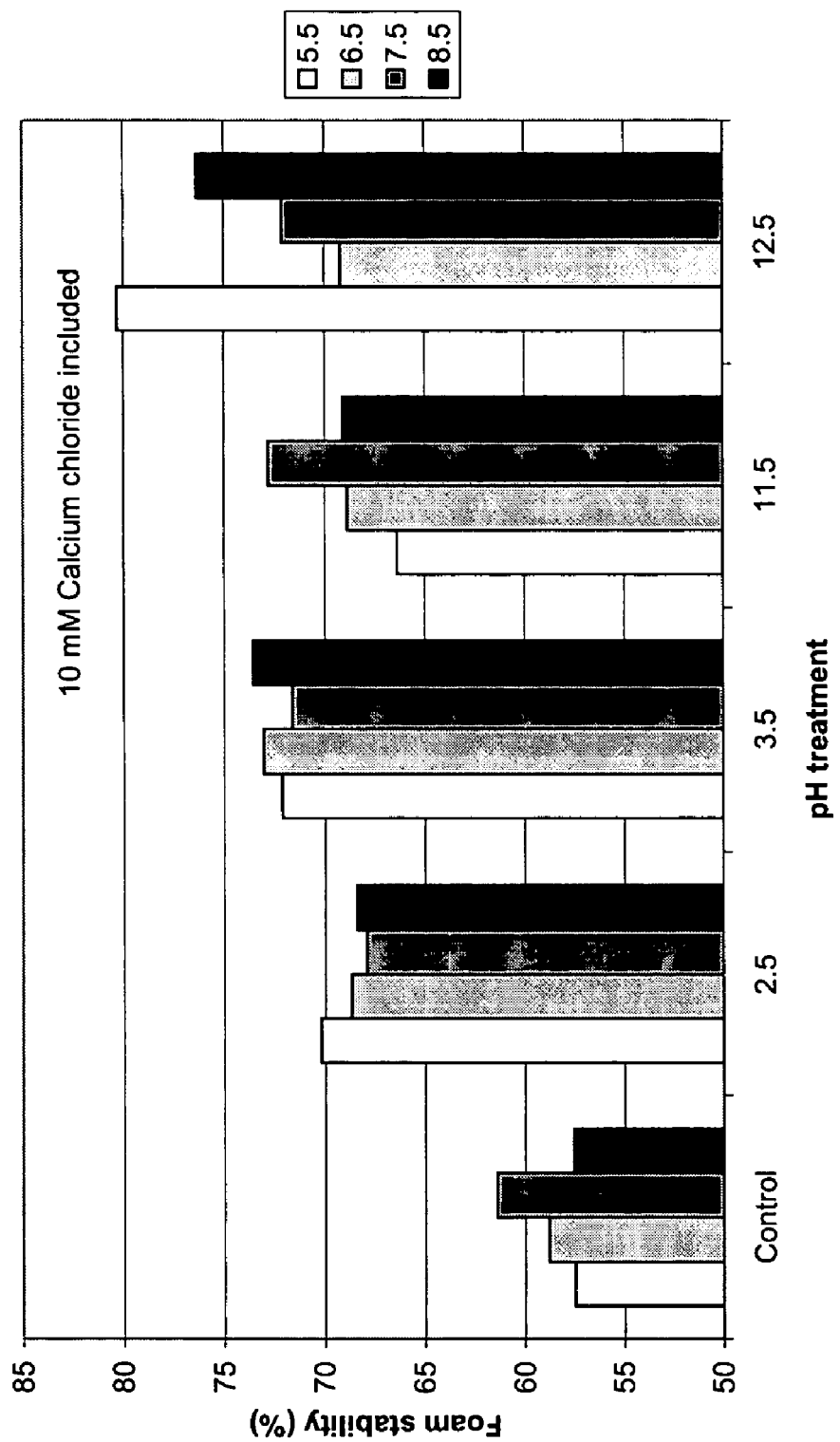
FIG. 5 shows foam stability of egg albumin in 10 mM $CaCl_2$ solution after adjustment to different low and high pH values for 1 hour followed by readjustment to pH 5.5–8.5.

FIG. 5 shows foam stability of egg albumin in 10 mM $CaCl_2$ solution after adjustment to different low and high pH values for 1 hour followed by readjustment to pH 5.5–8.5. Foam-formation conditions and meaning of stability are explained above regarding FIG. 3.

EXAMPLE 10

Effects of Ionic Strength During Different pH Treatments

Figure 6:
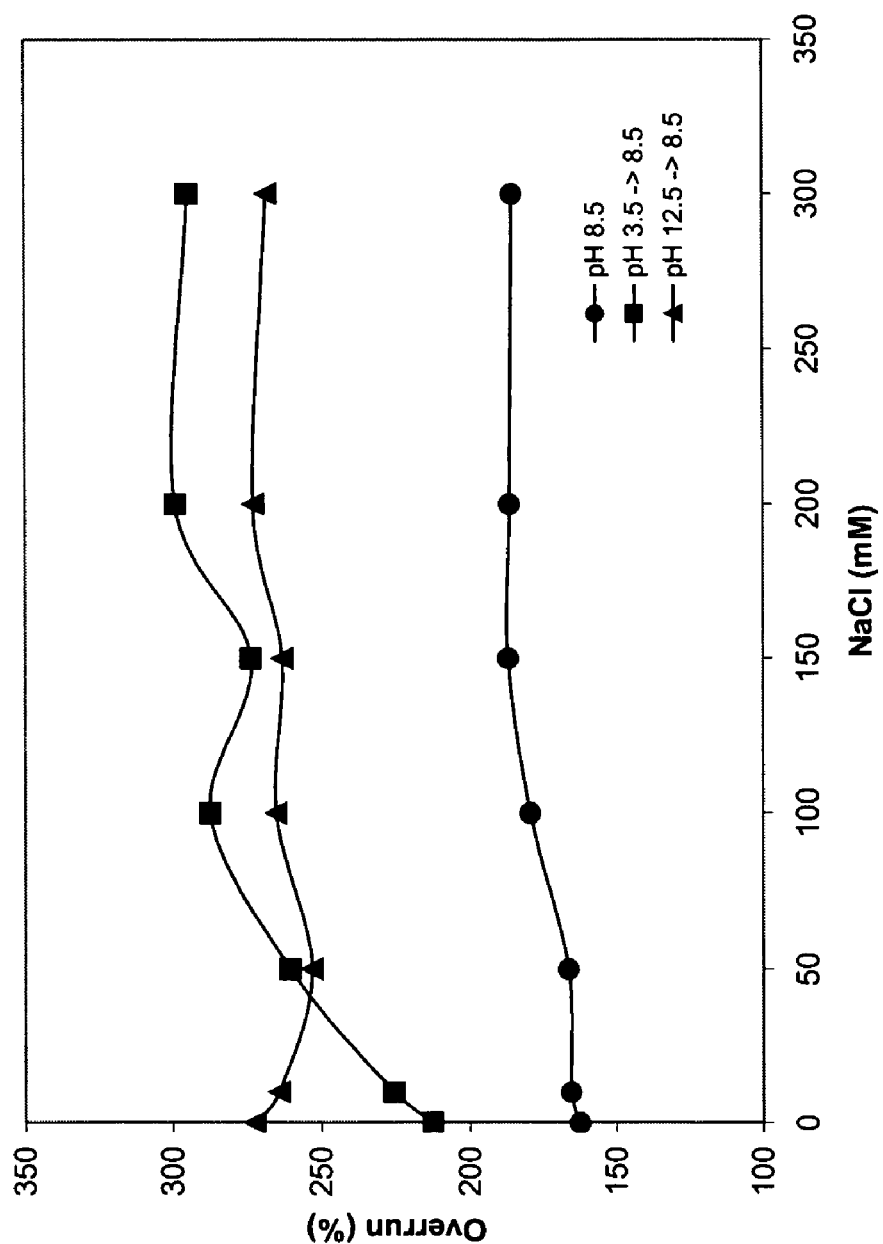
FIG. 6 shows the influence of ionic strength (NaCl concentration) on the foamability of egg albumin.
Figure 7:
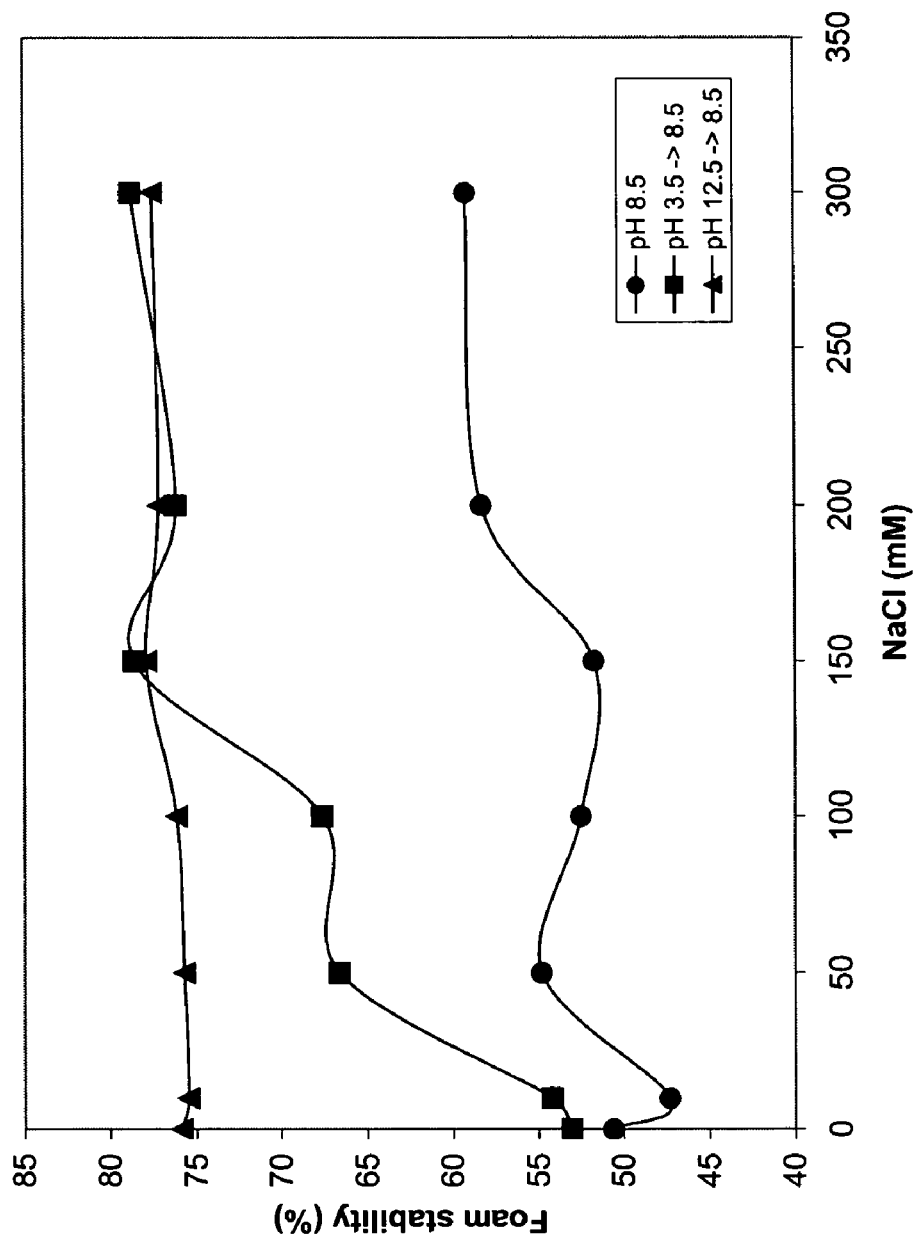
FIG. 7 shows the influence of ionic strength (NaCl concentration) on the foam stability of egg albumin.

The subject research indicates that ionic strength only influences the acid pH treatment of egg albumin, with increasing salt concentration leading to increased foamability and stability. The alkali pH treatment is largely unaffected by ionic strength. This means that improved foamability with the alkaline treatment can be achieved at a range of ionic strengths. This is important since foods can vary greatly in ionic strength. FIGS. 6 and 7 show examples of the subject findings on the effect of ionic strength.

FIG. 6 shows the influence of ionic strength (NaCl concentration) on the foamability of egg albumin. Control (pH 8.5), acid treated (adjusted to pH 3.5 for 1 hour followed by adjustment to pH 8.5), and alkali treated (adjusted to pH 12.5 for 1 hour followed by adjustment to pH 8.5) are shown.

FIG. 7 shows the influence of ionic strength (NaCl concentration) on the foam stability of egg albumin. Control (pH 8.5), acid treated (adjusted to pH 3.5 for 1 hour followed by adjustment to pH 8.5), and alkali treated (adjusted to pH 12.5 for 1 hour followed by adjustment to pH 8.5) are shown.

EXAMPLE 11

Effects of Sequence of Salt Addition

It was tested whether it made a difference if salt is added before pH treatment or after pH treatments. The subject results show that this makes no difference. Thus, improvements in foamability are independent of the sequence salt is added. This allows for great process flexibility as, according to the subject invention, salts can be added at any given point during the production of foods where albumins will be added for their foaming properties.

EXAMPLE 12

Effects of Unfolding and Refolding Time

Improving foaming (overrun, stability, and drainage) was found to be largely independent of sitting time at different low and high pH's (protein unfolding pH's) and also sitting times after pH readjustment at various desired foam pH's (protein refolding pH's). This means that variations in foam improvement are at minimum for the subject technology and processing times can be variable allowing for more process flexibility.

EXAMPLE 13

Foam Texture

Foam texture of the pH-treated egg albumins is significantly different than untreated albumin. Foams are significantly thicker, but foam texture can be varied by varying pH-treatment process parameters.

Figure 8:
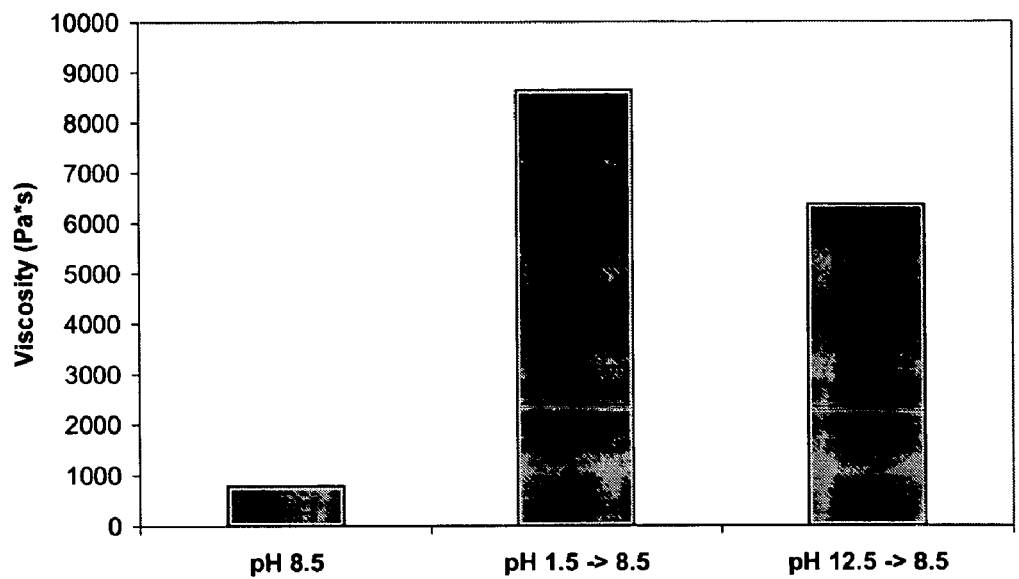
FIGS. 8 and 9 illustrate foam texture (thickness and firmness) of egg albumin foams after adjustment to different low and high pH values for 1 hour followed by readjustment to pH 8.5.
Figure 9:
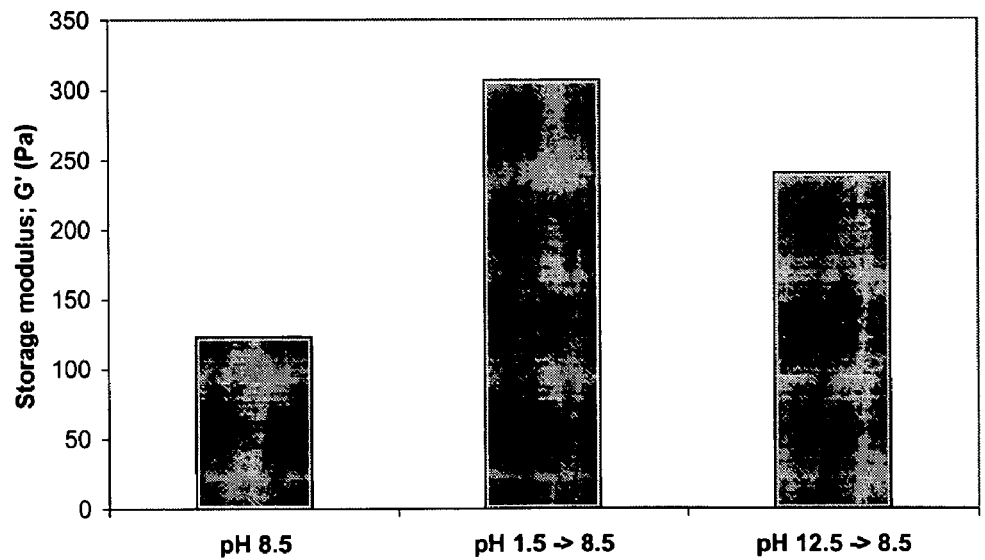

Foam texture was evaluated using rheology. Examples of acid (pH 1.5->8.5) and alkali (pH 12.5->8.5) treated foams were found to have much thicker foams than the control (pH 8.5). FIG. 8 shows a dramatic increase in viscosity of the foams on acid and alkali treatment. FIG. 9 shows that storage modulus (indicator of firmness) is also significantly increased for acid and alkali treated egg albumin. Thicker foams translates to higher stability on processing and more stable and more firm final products (e.g. meringue and angel food cake). Foam collapse is a problem with egg albumin/white, and this problem can be avoided with the pH treated foams.

FIGS. 8 and 9 illustrate foam texture (thickness and firmness) of egg albumin foams after adjustment to different low and high pH values for 1 hour followed by readjustment to pH 8.5. Egg albumin (solution at 2.5% protein concentration) sat at pH 8.5 for 45 min before whipping with a Bamix homogenizer with a foam disk attachment for 1 min. Control refers to egg albumin which was not treated to low or high pH but directly adjusted to pH 8.5 before foaming. FIG. 8 shows viscosity (thickness) as a function of treatment, and FIG. 9 shows the storage modulus (firmness) as a function of treatment. Foams were analyzed for viscosity and storage modulus in a low strain oscillatory rheometer between two plates.

EXAMPLE 14

Emulsification Properties

Some of the subject pH-treated egg albumins have improved emulsification abilities (both better emulsion formation and stability), meaning they can more effectively stabilize oil droplets in water. Applications for this include salad dressings, sauces, soups, sausages, hams, processed meats in general, etc.

For example, Table 2 shows the stability of a 50:50 oil-in-water emulsion made with 1% egg albumin solution after pH-treatment (30 min). Emulsion was formed with a Tissue Tearor homogenizer at speed 20 for 1 min. Emulsion stability is the time it took the emulsion to break down (separate) after formation.

TABLE 2

| | Emulsion stability |
|---|---|
| Control (pH 8.5) | 3 h |
| pH 2.5 -> 8.5 | 7 h |
| pH 11.5 -> 8.5 | 5.5 h |

Additional experiments were conducted with different concentrations of egg proteins. Much higher emulsion stability was achieved that even exceeded the data shown above in Table 2. The data of Table 2 was obtained using a pH not typical for emulsions. The following data was obtained using lower pHs.

For example, Table 3 shows the stability of oil-in-water emulsion made with 0.3% egg albumin solution after pH-treatment. Egg albumin solutions were adjusted to a low/high pH and sat at 30 min followed by readjustment to pH 8.5 and sitting for 30 min. Emulsion was formed by adding equal volume of egg albumin solution and canola oil and homogenizing for 1 min at speed 10 with a Tissue Tearor homogenizer. Emulsion stability (room temperature) is the time it took the emulsion to reach maximum separation of water and oil after formation.

TABLE 3

|  | Emulsion stability |
| --- | --- |
| Control (pH 7.5) | 1.2 h |
| pH 2 -> 7.5 | >7 days* |
| pH 12 -> 7.5 | >7 days* |

*Experiment was still on-going and emulsion had not separated.

EXAMPLE 15

Gelation Properties

The gel forming properties of pH-treated egg albumin solutions were presently investigated by various gel formation and gel strength tests. These tests have shown that pH-treated albumins have modified textures compared to untreated egg albumins. Thus, according to the subject invention, a variety of textures can be formed with the pH treated proteins, depending on the application needs. This significantly extends the use of egg albumins as gelling ingredients in the food industry (where they are already extensively used).

As would be recognized by one skilled in the art having the benefit of the subject disclosure, this technology can also be used to improve egg proteins (particularly egg whites and egg white proteins) as binding agents. For example, egg whites are added to muscle foods (such as fish meat) as binders to make, for example, imitation crab legs and scallops.

Rheological testing has presently shown that pH-treated albumins form better gels than untreated albumins. The gelation data also showed that pH treated egg albumins start to gel at lower temperatures due to their partly unfolded structure.

Figure 10:
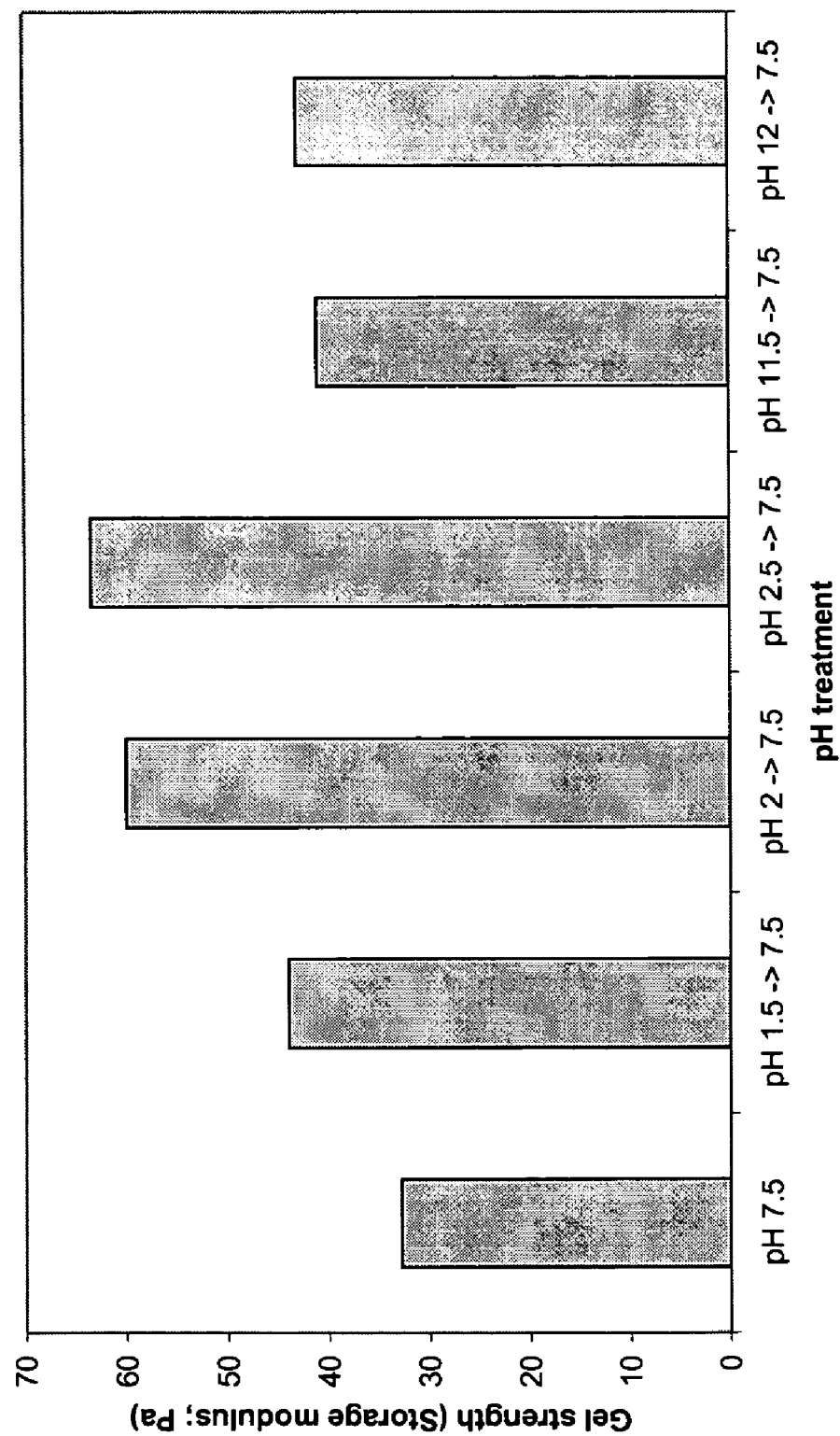
FIG. 10 shows gel strength of pH-treated egg albumin gels as determined by low strain oscillatory rheology.

FIG. 10 shows gel strength of pH-treated egg albumin gels as determined by low strain oscillatory rheology. Samples were at 2.5% protein concentration and at 100 mM NaCl. pH 7.5 was the untreated control. Samples were heated from 20° C. to 90° C. and then cooled to 20° C. at 2° C./min and storage modulus recorded. The graph shows the storage modulus after cooling to 20° C.

EXAMPLE 16

Gel Texture and Strength (Firmness and Elasticity)

Figure 11:
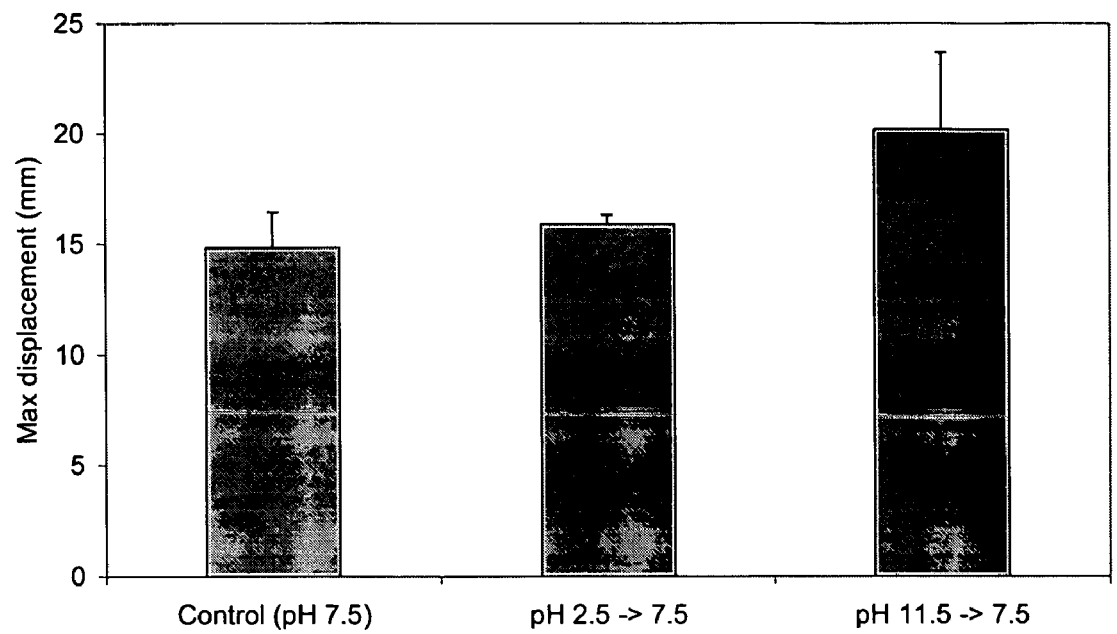
FIGS. 11 and 12 show firmness/strength and elasticity of thermally gelled untreated and pH treated egg albumin solution (12.5% protein).
Figure 12:
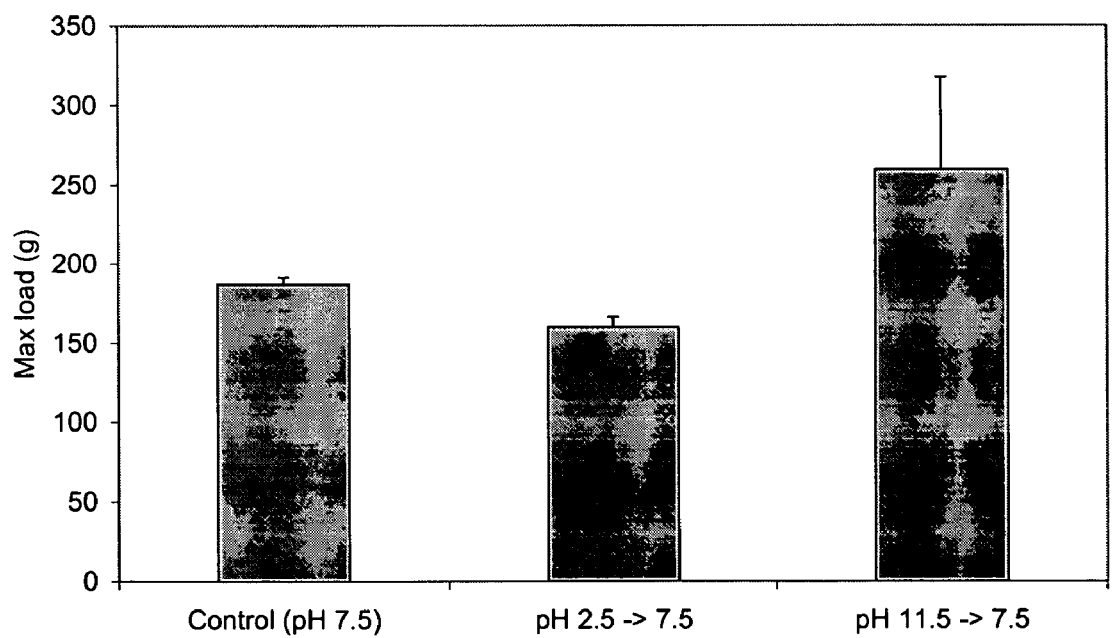

Cylindrical gels (18 mm diameter and 20 cm length) were formed from untreated and pH treated egg albumin solution at 12.5% protein concentration by heating at 90° C. for 25 min. Gels were allowed to cool at 4° C. for 24 hours and then cut into 1 inch cylinders. Each gel cylinder was tested for gel strength and elasticity by using a Instron texture machine. A 5 mm flat cylindrical probe was penetrated at a speed of 5 mm/min into the gel and the firmness and elasticity measured. FIG. 11 shows how far the probe could penetrate the egg albumin gel before it broke. The control and acid treatment (pH 2.5->7.5) had similar resistance to breaking. The alkaline treatment (pH 11.5->7.5) had, on the other hand, significantly higher resistance to breaking, thus representing a firmer and stronger gel. FIG. 12 shows the maximum load which is the maximum force exerted by the gel on penetration before the gel broke. It can be seen that the force is highest for the alkaline treatment, thus representing a firmer/stronger gel. The acid treated proteins had a significantly lower max load than the control (even though max displacement was similar). This shows that the acid treated gels have a softer and more elastic texture than the control and alkali treated gels. This shows that different textures can be achieved by different pH treatments (stronger gels by alkali treatment and softer more elastic gels by acid treatment). This allows a broad range of gelation applications with the pH treated proteins.

FIG. 10, discussed above, shows that low pH gave a stronger gel than control and alkali treatment when using rheology. This was done at a low protein concentrations (2.5%). The data in FIGS. 11 and 12 was done at a much higher concentration (close to that in egg white) and gave the opposite results. Cylindrical gels, as those tested in FIGS. 11 and 12, cannot be made at 2.5%. To further assess the differences observed at low and high pH with these two different methods, rheology was also performed at 12.5%. Rheology data (see FIG. 13) shows that the alkali treatments do in fact produce significantly stronger gels at the higher protein concentration while the acid treatment forms slightly softer gels than control. This suggests that acid treated proteins are better gel formers when used at low concentrations in a food while the alkali treated protein are significantly better (i.e., stronger) when used at high concentrations. This further shows the very broad range of applications one can use the proteins at depending on how they are pH treated.

Figure 13:
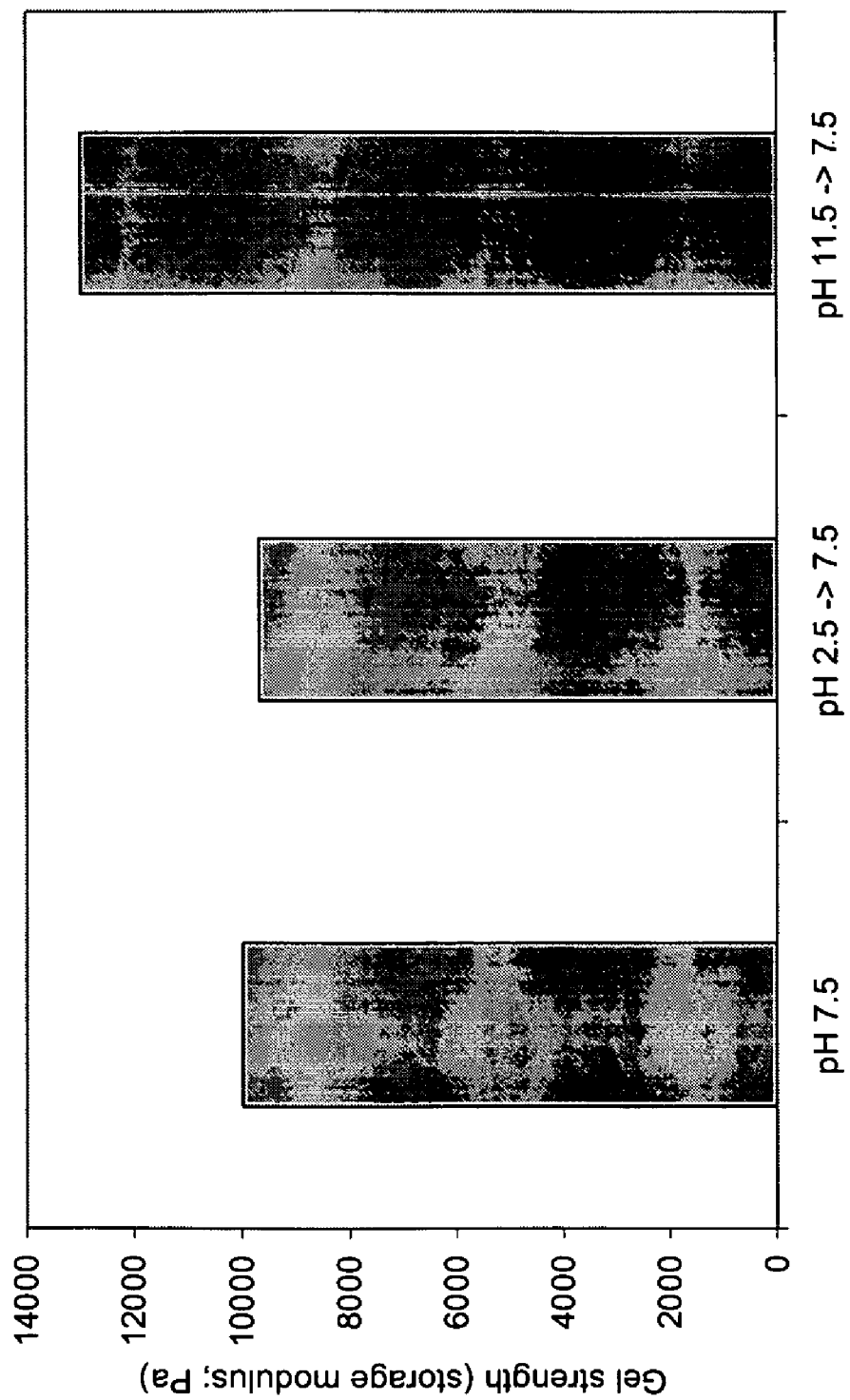
FIG. 13 shows gel strength of pH-treated egg albumin gels as determined by low strain oscillatory rheology.

FIG. 13 shows gel strength of pH-treated egg albumin gels as determined by low strain oscillatory rheology. Samples were at 12.5% protein concentration and at 100 mM NaCl. pH 7.5 was the untreated control. Samples were heated from 20° C. to 90° C. and then cooled to 20° C. at 2° C./min and storage modulus recorded. The graph shows the storage modulus after cooling to 20° C.

REFERENCES

Creighton, T. E. Proteins: Structures and Molecular Properties, 2 ed.; W. H. Freeman and Company: New York, 1993.

Damodaran, S. Protein-stabilized foams and emulsion. In Food Proteins and Their Applications; S. Damodaran and A. Paraf, Eds.; Marcel Dekker, Inc.: New York, 1997; pp 25–56.

Dickinson, E.; Matsumura, Y. Proteins at liquid interfaces: role of the molten globule state. Colloids Surfaces 1994, 3, 1–17.

Dickinson, E.; Rolfe, S. E.; Dalgleish, D. G. Competitive adsorption of a21-casein and b-casein in oil-in-water emulsions. Food Hydrocolloids 1988, 2, 397–405.

Dill, K. A. Dominant forces in protein folding. Biochemistry 1990, 29, 7133–7155.

Dill, K. A.; Shortle, D. Denatured states of proteins. Annu. Rev. Biochem. 1991, 60, 795–825.

Fink, A. L.; Calciano, L. J.; Goto, Y.; Kurotsu, T.; Palleros, D. R. Classification of acid denaturation of proteins: Intermediates and unfolded states. Biochemistry 1994, 33, 12504–12511.

Froning, G. W. New product innovations from eggs. In New and Developing Sources of Food Proteins. B. J. F. Hudson, Ed.; Chapman and Hall, London, 1994; pp. 71–94.

Gazova, Z.; Antalik, M.; Bagelova, J.; Tomori, Z. Effect of ionic strength on the interfacial properties of cytochrome c. Biochim. Biophys. Acta 1999, 1432, 82–91.

Goto, Y.; Calciano, L. J.; Fink, A. L. Acid-induced folding of proteins. Proc. Natl. Acad. Sci. 1990a, 87, 573–577.

Goto, Y.; Takahashi, N.; Fink, A. L. Mechanism of acid-induced folding of proteins. Biochemistry 1990b, 29, 3480–3488.

Goto, Y.; Fink, A. L. Conformational states of b-lactamase: Molten-globule states at acidic and alkaline pH with high salt. Biochemistry 1989, 28, 945–952.

Goto, Y.; Fink, A. L. Phase diagram for acidic conformational states of apomyoglobin. J. Mol. Biol. 1990, 214, 803–805.

Goto, Y.; Fink, A. L. Acid-induced folding of heme proteins. Meth. Enz. 1994, 232, 3–15.

Goto, Y.; Nishikiori, S. Role of electrostatic repulsion in the acidic molten globule of cytochrome c. J. Mol. Biol. 1991, 222, 679–686.

Graham, D. E.; Phillips, M. The conformation of proteins at the air-water interface and their role in stabilizing foams. In Foams.; R. J. Akers, Ed.; Academic Press, London, 1976; pp. 237–255.

Haezebrouck, P.; Joniau, M.; Van Dael, H.; Hooke, S. D.; Woodruff, N. D.; Dobson, M. An equilibrium partially folded state of human lysozyme at low pH. J. Mol. Biol. 1995, 246, 382–387.

Hammershoj, M.; Qvist, K. B. Importance of hen age and egg storage time for egg albumen foaming. Lebensm.-Wiss. u.-Technol., 2001, 34, 118–120.

Hirose, M. Molten globule state of food proteins. Trends Food Sci. Technol. 1993, 4, 48–51.

Hirose, M.; Yamashita, H. Partially folded state of the disulfide-reduced N-terminal half molecule of ovotransferrin as a renaturation intermediate. J. Biol. Chem. 1991, 266, 1463–1468.

Johnson, T. M.; Zabik, M. E. Response surface methodology for analysis of protein interactions in angel food cakes. J. Food Sci. 1981, 46, 1226–1230.

Khan, S, A.; Schnepper, C. A.; Armstrong, R. C. Foam rheology: III. Measurement of shear flow properties. J. Rheology, 1988, 32, 69–92.

Kilara, A.; Harwalkar, V. R. Denaturation. In Food Proteins. Properties and Characterization. S. Nakai; Modler, H. W., Eds.; VCH Publishers; New York, 1996; pp 71–165.

Kitabake, N.; Doi, E. Conformational change of hen egg albumen during foam formation detected by 5,5'-dithiobis (2-nitrobenzoic acid). J. Agric. Food Chem. 1987, 35, 953–957.

Kristinsson, H. G. Evaluation of different methods to isolate cod (Gadus morhua) muscle myosin. J. Food Biochem. 2001, 25, 249–256.

Kristinsson, H. G. Conformational and functional changes of hemoglobin and myosin induced by pH: Functional role in fish quality. Ph.D. dissertation. University of Massachusetts at Amherst, 2002a.

Kristinsson, H. G. Acid-Induced Unfolding of Flounder Hemoglobin: Evidence for a Molten Globular State with Enhanced Pro-oxidative Activity. J. Agric. Food Chem. 2002b, 50, 7669–7676.

Kristinsson, H. G.; Hultin, H. O. Changes in conformation and subunit assembly of cod myosin at low and high pH and after subsequent refolding. J. Agric. Food Chem. Submitted. 2003b Kristinsson, H. G.; Hultin, H. O. Effect of Low and High pH Treatment on the Functional Properties of Cod Muscle Proteins. J. Agric. Food Chem. Accepted. 2003a Kuwajima, K. The molten globule state as a clue for understanding the folding and cooperativity of globular protein structure. Proteins: Struct. Funct. Genet. 1989, 6, 87–103.

Laemmli, U. K. Cleavage of structural proteins during the assembly of the head of bacteriophage T4. Nature, 1970, 227, 680–685.

Lee, J. Y.; Hirose, M. Partially folded state of the disulfide-reduced form of human serum-albumen as an intermediate for reversible denaturation. J. Biol. Chem. 1992, 267, 14753–14758.

Lin, T. M.; Park, J. W. Solubility of salmon myosin as affected by conformational changes at various ionic strengths and pH. J. Food Sci. 1998, 63, 215–218.

Luck, P. J.; Bray, N.; Foegeding, E. A. Factors determining yield stress and overrun of whey protein foams. J. Food Sci. 2002, 67, 1677–1681.

Matsumura, Y.; Mitsui, S.; Dickinson, E.; Mori, T. Competitive adsorption of alpha-lactalbumen in the molten globule state. Food Hydrocolloids 1994, 8, 555–566.

Markwell, M. A. K.; Haas, S. M.; Bieber, L. L.; Tolbert, R. E. Modification of Lowry procedure to simplify protein determination in membrane and lipoprotein samples. Anal. Biochem. 1978, 87, 206–210.

Nakamura, R. Studies on the foaming property of the chicken egg white. VI. Spread monolayer of the protein fraction of the chicken egg white. Agric. Biol. Chem. 1964, 28, 403–407.

Nakamura, R.; Doi, E. Egg processing. In Food Proteins. Processing Applications; S. Nakai; H. W. Modler, Eds.; Wiley-VCH, New York, 2000; pp. 171–207.

Nishii, I.; Kataoka, M.; Goto, Y. Thermodynamic stability of the molten globule states of apomyoglobin. J. Mol. Biol. 1995, 250, 223–238.

Oakenfull, D.; Pearce, J.; Burley, R. W. Protein gelation. In Food Proteins and Their Applications; S. Damodaran and A. Paraf, Eds.; Marcel Dekker, Inc.: New York, 1997; pp 111–142.

Princen, H. M.; Kiss, A. D. Rheology of foams and highly concentrated emulsions IV. An experimental study of the shear viscosity and yield stress of concentrated emulsions. Colloid. Interface. Sci., 1989, 128, 176–187.

Sedlak, E.; Antalik, M. Molten globule-like state of cytochrome c induced by polyanion poly(vinylsulfate) in slightly acidic pH. Biochim. Biophys. Acta 1999, 1434, 347–355.

Trziszka, T.; Protein aggregation during whipping of egg-white and its effect on the structure and mechanical properties of foam. Archiv. Geflugelkunde, 1993, 57, 27–33.

Walstra, P. Dispersed systems: Basic considerations. In Food Chemistry. O. R. Fennema, Ed.; Marcel Dekker, Inc.; New York, 1996; pp. 95–155.

Zhu, H.; Damodaran, S. Heat-induced conformational changes in whey protein isolate and its relation to foaming properties. J. Agric. Food Chem. 1994, 42, 849–848.

What is claimed is:

1. A method for improving a food-application property of egg white proteins wherein said method comprises improving said property without thermal input by adjusting said proteins to an adjusted pH in a range selected from the group consisting of a low pH below 4.5 and a high pH above 8.5 and holding said proteins at said adjusted pH so that said proteins are partially denatured, followed by readjusting said proteins to a readjusted pH between 3 and 10.5, and maintaining said proteins at said readjusted pH so that said proteins are renatured at least partially.

2. The method of claim 1 wherein said method comprises adjusting said proteins to a low pH in a low pH range of 1 to 4 followed by readjusting said proteins to a pH in a readjusted pH range of 4 to 10.

3. The method of claim 1 wherein said method comprises adjusting said proteins to a high pH in a high pH range of 10 to 14 followed by readjusting said proteins to a pH in a readjusted pH range of 4 to 10.

4. The method of claim 1 wherein said method comprises adjusting said proteins to a low pH in a low pH range of 2.5 to 3.5 followed by readjusting said proteins to a pH in a readjusted pH range of 4.5 to 8.5.

5. The method of claim 1 wherein said method comprises adjusting said proteins to a high pH in a high pH range of 10.5 to 12 followed by readjusting said proteins to a pH in a readjusted pH range of 4.5 to 8.5.

6. The method of claim 1 wherein said proteins are in a diluted liquid solution of egg albumin.

7. The method of claim 1 wherein said property is a foaming property, and said maintaining step is followed by whipping said proteins to form a foam.

8. The method of claim 1 wherein said property is an emulsification property, and said maintaining step is followed by emulsifying said proteins.

9. The method of claim 1 wherein said property is a gelation property, and said maintaining step is followed by gelling said proteins.

10. The method of claim 1 wherein said property is a binding property.

11. The method of claim 7 wherein said foaming property is selected from the group consisting of foamability, foam stability, and foam texture.

12. The method of claim 8 wherein said emulsifaction property is selected from the group consisting of emulsion formation and emulsion stability.

13. The method of claim 9 wherein said gelation property is selected from the group consisting of gel formation, gel strength, and gel texture.

14. The method of claim 1 wherein said method further comprises providing an ionic concentration to said proteins and said ionic concentration further improves said property.

15. The method of claim 14 wherein said ionic concentration is provided at a, time selected from the group consisting of before, during, and after said adjusting step.

16. The method of claim 14 wherein said ionic concentration is a concentration of an ion selected from the group consisting of $KCl$, $MgCl_2$, $NaCl$, $CaCl_2$, $K$, $Na$, $Ca^{2+}$, $Cl$, and $Mg^{2+}$.

17. The method of claim 14 wherein said ionic concentration is in the approximate range of 10–300 mM.

18. The method of claim 14 wherein said method comprises adjusting said proteins to a low pH in the range of 1.5 to 3.5 followed by readjusting said proteins to a readjusted pH in the range of 4.5 to 9, and wherein said ionic concentration is in the range of 50–200 mM.

19. The method of claim 16 wherein said ion is selected from the group consisting of sodium chloride and calcium chloride.

* * * * *

UNITED STATES PATENT AND TRADEMARK OFFICE
CERTIFICATE OF CORRECTION

PATENT NO. : 7,005,158 B1
APPLICATION NO. : 10/881454
DATED : February 28, 2006
INVENTOR(S) : Hordur G. Kristinsson It is certified that error appears in the above-identified patent and that said Letters Patent is hereby corrected as shown below:

Column 7
Line 3, "(since it is party unfolded" should read --(since it is partly unfolded --.

Column 10
Line 22, " in at least triplicate" should read -- in at least triplicate --.

Column 20
Line 59, "849-848" should read --846-848--.

Column 22
Line 14, "at a, time" should read -- at a time--.

Signed and Sealed this

Twenty-fifth Day of July, 2006

JON W. DUDAS
*Director of the United States Patent and Trademark Office*